United States Patent [19]

Belanger

[11] 4,328,618
[45] May 11, 1982

[54] TACTILE MEASURING DEVICE

[76] Inventor: Robert L. Belanger, 17 Pine St., Waltham, Mass. 02154

[21] Appl. No.: 101,086

[22] Filed: Dec. 7, 1979

[51] Int. Cl.³ ............................................. G01B 3/02
[52] U.S. Cl. ................................... 33/125 R; 33/173; 33/168 B
[58] Field of Search ................ 33/173, 483, 494, 484, 33/168 B, 168 R, 125 R

[56] References Cited

U.S. PATENT DOCUMENTS

| 1,356,987 | 10/1920 | Ingle | 33/494 |
| 2,498,171 | 2/1950 | Michler | 33/168 R |
| 4,064,632 | 12/1977 | Waldecker | 33/143 D |

FOREIGN PATENT DOCUMENTS 588544  5/1947  United Kingdom ................. 33/170

Primary Examiner—Harry N. Haroian
Attorney, Agent, or Firm—Joseph S. Iandiorio

[57] ABSTRACT

A tactile measuring device including: a slide member adapted for sliding along a measuring rule; means for releasably securing the slide member at selected positions along the measuring rule to represent a predetermined measurement; and a plurality of primary gauge elements mounted with said slide member for movement between a retracted position and an extended position in which one or more of the elements tactilely represent an incremented change in the predetermined measurement.

11 Claims, 8 Drawing Figures

TACTILE MEASURING DEVICE

FIELD OF INVENTION

This invention relates to a tactile measuring device and more particularly to such a device which uses a number of moveable gauge elements.

BACKGROUND OF INVENTION

Present aids for the blind include measuring rules which bear Braille or other tactile means for indicating the various measurements. Typically such measuring rules bear Braille and other markings at each foot and each inch to enable blind people to measure distances. In some applications for closer tolerance work such markings may be provided at each half inch or even each quarter inch. Such close tolerance marking significantly increases the cost of the rulers and causes crowding of the marks on the ruler, which makes the marks confusing and hard to use. For example, on a one-foot rule with quarter-inch markings there are at least forty-eight different marks to indicate the quarter-inch divisions from one-quarter inch through twelve inches.

SUMMARY OF INVENTION

It is therefore an object of this invention to provide an improved tactile measuring device for use with a measuring rule.

It is a further object of this invention to provide such a device which facilitates even close tolerance measurement without need for additional close tolerance tactile marking on the measuring rule.

It is a further object of this invention to provide such a device which is simple, inexpensive to make, and easy to use.

It is a further object of this invention to provide such a device which may be used with many different types of measuring rules.

The invention features a tactile measuring device comprising a slide member adapted for sliding along a measuring rule. There are means for releasably securing the slide member at selected positions along the measuring rule to represent a predetermined measurement. A plurality of primary gauge elements are mounted with the slide member for movement between a retracted position and an extended position in which one or more of the elements tactilely represent an incremented change in the predetermined measurement.

The means for securing may include gripping means or a detent which engages with the indexed recesses on the measuring rule. The primary gauge elements may extend or retract transversely across the rule or longitudinally along the rule. All of the primary gauge elements may be of the same thickness and in a preferred embodiment are one-eighth inch thick. The primary gauge elements may be mounted to the slide member in various ways to provide the relative motion between the extended and retracted positions. For example, they may be pivotally mounted for rotation or slidably mounted by one or more pins fixed to the slide member.

In addition, there may be one or more secondary gauge elements which are separately flexibly interconnected with the slide member for tactilely representing an incremental change in the predetermined measurement of a different size than the primary gauge elements.

DISCLOSURE OF PREFERRED EMBODIMENT

Other objects, features and advantages will occur from the following description of a preferred embodiment and the accompanying drawings, in which.

The invention may be accomplished with a tactile measuring device including a slide member adapted for sliding along the measuring rule. The measuring rule may be curved or straight and may be in any convenient units of measure, for example in the Metric or English system. In addition, for the use of blind persons the rule may contain Braille or other tactile representations of the measuring unit. In addition to being straight or curved the rule may be of the variety known as a yardstick, meter stick, foot rule and the like, or may be a tape measure or other collapsible or retractable type of measuring rule. When the measuring rule includes a housing or other suitable structure, the tactile measuring device according to this invention may be releasably connected to and form a part of that structure.

There are means for releasably securing the slide member at selected positions along the rule in order to represent a predetermined measurement. For example, there may be a releasable detent extending from the tactile device which engages with index recesses, for example at the one-inch marks or at every half inch or quarter inch or eighth inch along the rule. Other types of securing devices such as frictional pads and the like may also be used.

There are a plurality of primary gauge elements mounted with the slide member for movement between a retracted position and an extended position in which one or more of the elements tactilely represent an incremental change in the predetermined measurement. These primary gauge elements may extend and retract transversely across the rule either by rotational movement about a pivot or by slidable movement. The gauge elements may be all of the same width, for example ⅛ inch, 1/16 inch, 1/32 inch, so that by extending successive ones of the elements a variation in the reading may be sensed. The gauge elements may be of different thicknesses, but preferably they are the same. For ease of manufacture it has been found that ⅛ inch is easy to make and yet gives quite an improvement in the accuracy with which a blind person can use a measuring rule; but the invention certainly is not limited to ⅛ inch elements.

An auxiliary or secondary set of gauge elements which includes one or more additional gauge elements may be provided and flexibly attached to the device such as by a chain. Typically these secondary gauge elements are of different thickness than those included in the primary gauge elements in order to given additional flexibility in the measuring of objects.

Figure 1:
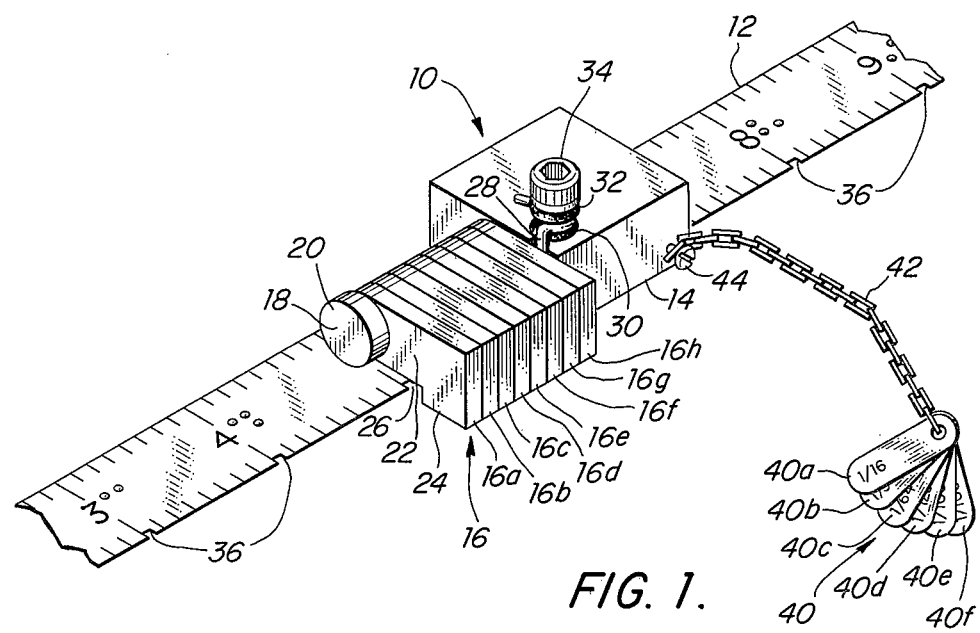
FIG. 1 is an axonometric view of a slide member according to this invention mounted on a measuring rule.

There is shown in FIG. 1 a tactile measuring device 10 according to this invention mounted on a measuring rule 12. Device 10 includes a slide member block 14 and a set of primary gauge elements 16a–h, which are pivotally mounted on rod 18, having an enlarged head 20. Elements 16a–h are each formed with a narrow shank 22 and an enlarged foot 24 which provides relieved area 26 to accommodate rule 12 when elements 16a–h are in the retracted position as shown in FIG. 1. There is also included some means for releasably securing block 14 to rule 12 such as spring wire 28, held in place between washers 30, 32 by screw 34, which extends downwardly and engages with index recesses 36, which in this rule occur at each inch marking. A second set of gauge elements 40 is attached through chain 42 to block 14 by means of screw 44. Secondary gauge element 40 typically includes one or more elements 40a, 40b, 40c, 40d, 40e, 40f of different thicknesses, for example respectively 1/16, 1/32, 1/64, 1/128, 1/100, and 1/1000 of an inch.

Figure 2:
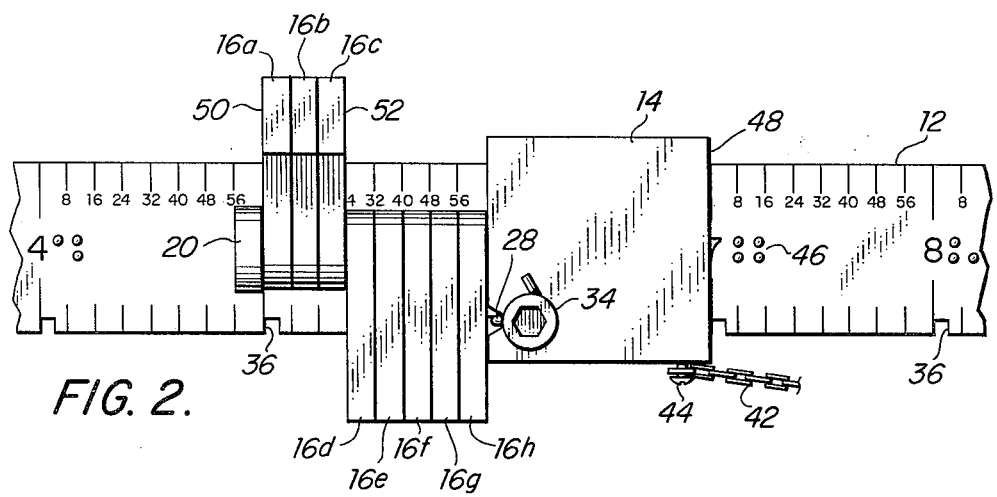
FIG. 2 is a plan view of the device of FIG. 1 representing an incremental variation of three-eighths of an inch.

In operation a blind person first tactilely feels the Braille impression 46, FIG. 2, at the seven-inch mark, then slides block 14 up until the rear edge 48 of block 14 is abutting the person's finger and spring wire 28 indexes into the recess 36 at the six-inch mark. At that point the leading edge 50 of the first element 16a is at the five-inch mark. Then by simply rotating the first three elements 16a, b, and c from the retracted position to the extended position as shown in FIG. 2, the blind person knows that the lagging edge 52 of element 16c is at 5⅜ inches.

Figure 3:
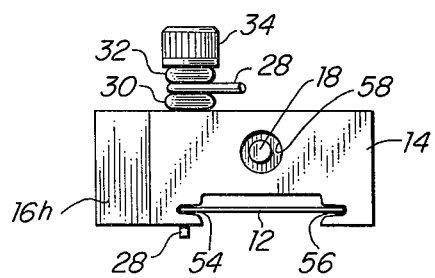
FIG. 3 is an elevational view of the device with all of the primary gauge elements retracted, viewed from the right in FIG. 2.
Figure 4:
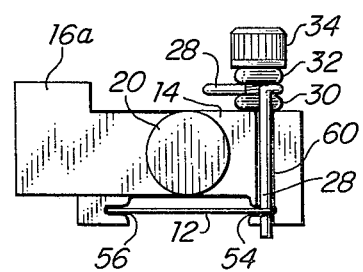
FIG. 4 is an elevational view of the device with all of the primary gauge elements extended, viewed from the left in FIG. 2.

Typically block 14, FIG. 3, includes channels 54, 56, for receiving the edges of rule 12. Shaft 18 may be fastened in hole 58 in block 14. Spring wire 28, FIG. 4, is recessed in groove 60, FIG. 4, to avoid interference with gauge element 16h and extends into channel 54 as shown in FIGS. 3 and 4 to ensure engagement with index recesses 36 on the rule.

Figure 5:
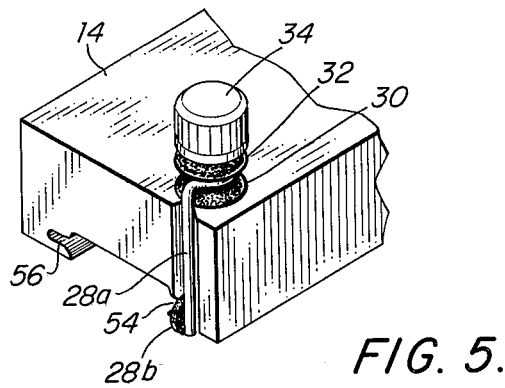
FIG. 5 is a partial axonometric view of a slide member according to this invention using a frictional securing device.

Although the embodiments thus far disclosed uses a detent which engages with an indexing recess on the rule, this is not a necessary limitation of the invention. For example as shown in FIG. 5, spring wire 28a may be provided with a friction pad 28b which bears on and grips the edge of rule 12.

Figure 6:
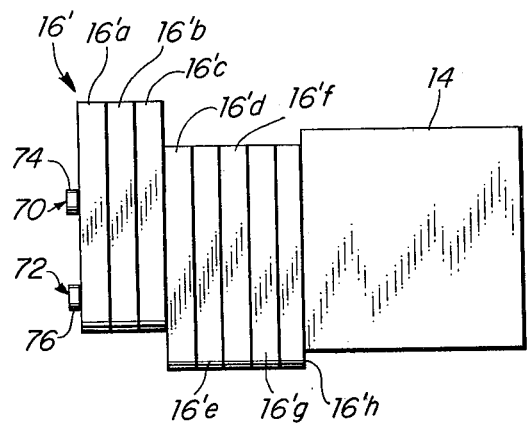
FIG. 6 is a plan view of an alternative embodiment of the tactile measuring device according to this invention using slidably mounted gauge elements.
Figure 7:
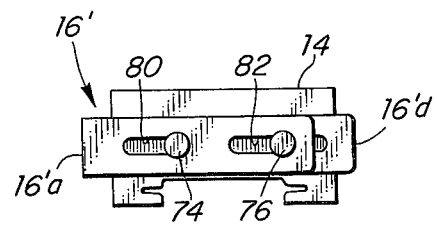
FIG. 7 is an elevational view from the left in FIG. 6.

Gauge elements 16a–h have been shown pivotally mounted for rotation between the retracted and extended positions, but this is not a necessary limitation of the invention, as any other suitable type of motion may be used. For example, primary gauge elements 16', FIGS. 6 and 7, may be slidably mounted on pins 70, 72, having enlarged heads 74, 76. Each element 16'a–h incudes slots 80, 82, FIG. 7, which permit elements 16'a–h to be slid between the retracted position such as occupied by elements 16'd–h, and the extended position such as depicted by elements 16'a–c.

Figure 8:
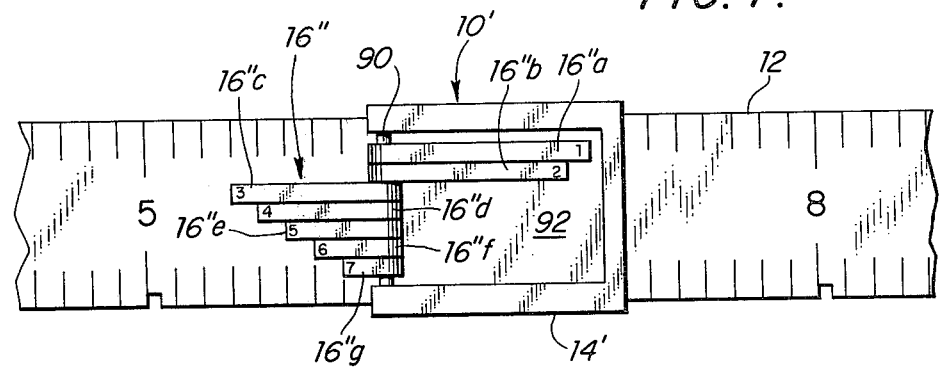
FIG. 8 is a plan view of another embodiment of the tactile measuring device of this invention using gauge elements which extend longitudinally of the measuring rule.

Tactile device 10 has been shown implemented with a number of gauge elements that extend transversely across rule 12. However, this is not a necessary limitation of the invention. For example as shown in FIG. 8 the primary gauge elements 16" may include a plurality of elements 16"a–g which extend longitudinally of rule 12 and pivot about shaft 90 from a retracted position in recess 92 of block 14' such as occupied by elements 16"a and b, and the extended position presently exemplified by extended elements 16'c–g. As illustrated in FIG. 8 the retraction of elements 16"a and b and extension of element 16"c, irrespective of the position, retracted or extended, of the remaining elements 16d–g, gives a measure of 5⅜ inches which can be tactilely sensed by a blind person.

Other embodiments will occur to those skilled in the art and are within the following claims:

What is claimed is:

1. A tactile measuring device comprising:
   a measuring rule having indexed units of measure along its length;
   a slide member equal in length to a said unit of measure and adapted for sliding along said measuring rule and including means for releasably securing said slide member to said measuring rule at selected positions corresponding to said indexed units of measure; and
   a plurality of gauge elements mounted with said slide member for movement therewith along said measuring rule; all of said gauge elements together equalling the length of said slide member along said rule and each of said gauge elements representing an equal increment of measure; said gauge elements being mounted with said slide member for movement between a retracted position and an extended position in which one or more of the gauge elements tactilely represent a measurement along the measuring rule.

2. The measuring device of claim 1 in which said means for securing includes frictional gripping means.

3. The measuring device of claim 1 in which said means for securing includes a detent for engaging with index recesses on a measuring rule.

4. The measuring device of claim 1 in which said primary gauge elements extend and retract transversely across the rule.

5. The measuring device of claim 1 in which said primary gauge elements extend and retract along the rule.

6. The measuring device of claim 1 in which each of the said primary gauge elements are ⅛ inch thick.

7. The measuring device of claim 1 in which said primary gauge elements are pivotably mounted to rotate between the extended and retracted positions.

8. The measuring device of claim 1 in which said primary gauge elements are slidably mounted to move between the extended and retracted positions.

9. The measuring device of claim 1 further including at least one secondary gauge element separately interconnected with a slide member for tactilely representing an incremental change in the predetermined measurement of a different size than said primary gauge elements.

10. The device of claim 1 in which said selected positions along said measuring rule are coincident with said units of measure.

11. The device of claim 1 in which said slide member has a length along the ruler of one said unit of measure.

* * * * *